April 25, 1939.  J. A. McNALLY  2,155,436
OPTICAL INSTRUMENTALITY PROVIDED WITH A VARIABLE LIGHT FILTER
Filed Feb. 26, 1937
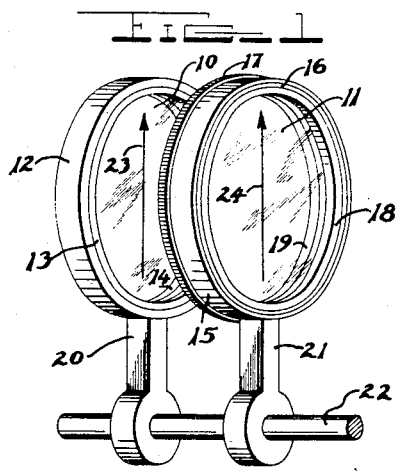
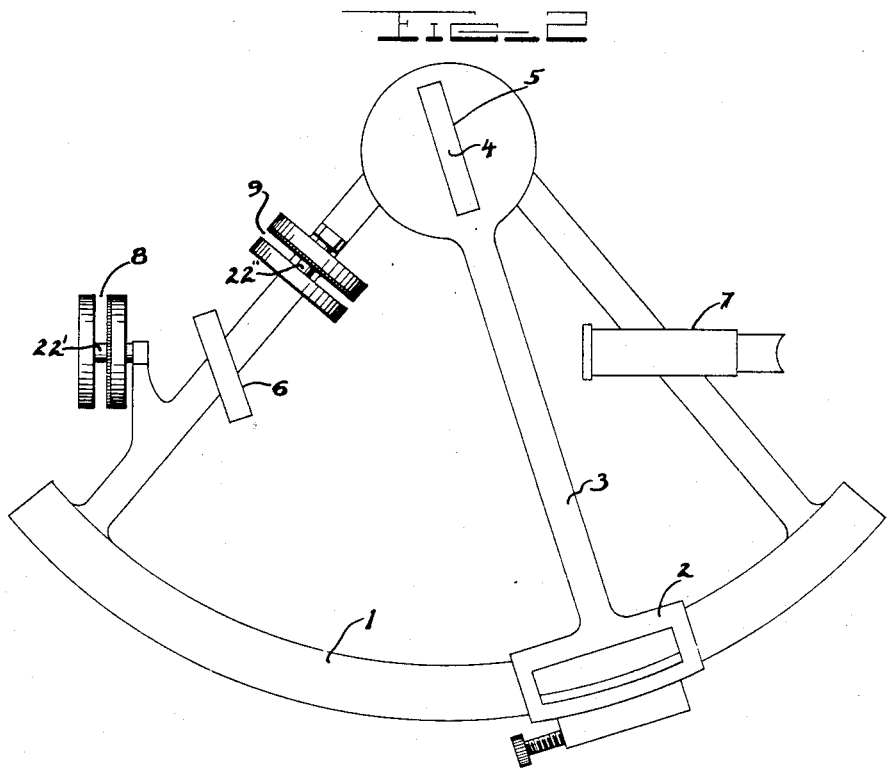
INVENTOR
JAMES A. McNALLY
BY
ATTORNEY Patented Apr. 25, 1939

2,155,436

UNITED STATES PATENT OFFICE 2,155,436

OPTICAL INSTRUMENTALITY PROVIDED WITH A VARIABLE LIGHT FILTER

James A. McNally, United States Navy

Application February 26, 1937, Serial No. 127,939

2 Claims. (Cl. 88—2.2)

(Granted under the act of March 3, 1883, as amended April 30, 1928; 370 O. G. 757)

My invention relates to an optical instrumentality provided with a variable light filter, the filter being one whose optical transmission may be quickly and continuously varied to thereby increase the efficiency and range of usefulness of the said instrumentality. As illustrating one field of application of the present invention it will be described as applied to a navigator's sextant.

Standard types of navigators' sextants are equipped with two sets of glass color filters, one set called the horizon filters which may be interposed between the eye of the observer and the horizon; and the other set, called the celestial filters, which may be placed between the eye of the observer and the celestial object, such as the sun, star, etc., under observation. Each of the aforementioned sets usually consists of three or four gray or colored glass filters any one or more of which may be placed in an operative position. In using the sextant various combinations of the horizon and celestial filters are chosen until the optimum distinctness of the horizon and celestial object is secured. To select the correct combination of filters requires time which may be troublesome, for example, when the sun is partially obscured by moving clouds. In such a case, because of the varying brightness of the sun, a celestial filter combination correct for one instant may be too dense in a succeeding instant. Furthermore, it occasionally happens that none of the possible combinations of filters gives exactly the effect desired, being either insufficiently transparent or too transparent.

With a view to obviating the prior art deficiencies, I have devised an improved filter the optical transmission of which may be quickly and continuously varied through a substantial range, the filter for this purpose comprising a plurality of polarizing bodies arranged so that one may be rotated with respect to the other. In addition, the polarizing bodies may be adjustably mounted if desired to enable the positioning of any one or more of said bodies into and out of an optical path of the sextant. Also one of the polarizing bodies may in its operative position have its polarizing axis substantially vertically positioned to thereby eliminate the horizontal light vector and secure increased definition of the object to be viewed.

With the foregoing preliminary discussion in view, it is among the several objects of my invention to provide an improved combination of an optical instrumentality and variable light filter wherein the filter comprises a plurality of relatively movable polarizing bodies; to provide an improved combination as aforesaid and adjustably mount the polarizing bodies so as to enable the positioning of any one or more of said bodies into and out of an optical path; and to mount one of the polarizing bodies so that in its operative position its polarizing axis will be substantially vertically positioned to thereby eliminate the horizontal light vector and secure increased definition of the object to be viewed.

Other objects and many of the attendant advantages of this invention will be readily appreciated as the same becomes better understood by reference to the following description when considered in connection with the accompanying sheet of drawing, wherein:

Fig. 1 shows in perspective the improved variable light filter; and,

Fig. 2 shows diagrammatically a conventional prior art sextant with which two of the variable filters of the type depicted in Fig. 1 have been combined to serve respectively as the horizon and celestial filters.

Turning now to the drawing, there is shown in Fig. 2 thereof the conventional type of sextant having an arc 1 along which there is slidable the vernier 2 carried by the index arm 3. The index arm is pivoted at the center of curvature 4 of the arc 1 and carries the index mirror 5 for cooperation with the horizon mirror 6. A telescope or sighting tube 7 is positioned as shown for viewing the horizon and the image of the celestial body under observation. For obtaining the desired definition and light intensity there is interposed in each optical path of the sextant a variable light filter of the type depicted in Fig. 1, the horizon filter and celestial filter being identified respectively by the reference characters 8 and 9. For a more complete understanding of the construction and mounting of the horizon and celestial filters 8 and 9 reference is now made to Fig. 1 of the drawing.

In this figure, there are shown two suitable polarizing bodies 10 and 11, the body 10 of which when in use is stationary and the other of which is rotatably mounted. While the polarizing bodies 10 and 11 have been shown as polarizing plates I do not desire to be restricted thereto since any polarizing bodies known to the prior art may be employed. Thus, as illustrative but not restrictive of other polarizing bodies, I may employ Nicol prisms if desired. When employing polarizing plates as depicted in Fig. 1 of the drawing, I may construct the same by mounting a suitable polarizing sheet between two sheets of thin glass for protective purposes, the sheets of glass being secured to the polarizing sheet by any suitable adhesive such as, for example, balsam cement. A suitable polarizing sheet may comprise a set suspension of polarizing particles in a transparent medium, the particles being oriented so that their polarizing axes are substantially aligned and held by the medium in fixed position. Such a polarizing sheet is disclosed in U. S. Patent No. 1,918,848 which was issued July 18, 1933, to Edwin H. Land and Joseph S. Friedman. The polarizing sheet described in the aforesaid patent may, if desired, be used in the fabrication of polarizing plates 10 and 11 without the protective covering of glass described hereinbefore.

The polarizing body 10 is mounted in the annular member 12 and is there held in a fixed and non-rotatable position by means of the locking rings 13 and 14, which rings in turn are secured in any suitable manner to the annular member 12. It is thus evident that the polarizing body 10 when in use will have a fixed and invariable position.

For mounting the polarizing body 11 there is provided an annular member 15, the inner periphery of which is frictionally and slidably engaged by a ring 16 on one end of which there is a projecting knurled flange 17 which enables the operator to rotate the ring to any desired position within the annular member 15. The polarizing body 11 is fixedly held in position in the rotatable ring 16 by locking rings 18 and 19 which are secured to the ring 16 in any suitable manner. From the foregoing, it is clear that the operator may by grasping the knurled flange 17 of the ring 16 rotate the polarizing body 11 to any desired position with respect to the stationary polarizing body 10.

The annular members 12 and 15 are mounted respectively on arms 20 and 21 which in turn frictionally and rotatably engage the bar or rod 22. The bar of the horizon filter 8 and that of the celestial filter 9 (Fig. 2) are identified respectively by the reference characters 22' and 22" and are suitably mounted on the sextant in the manner shown. By means of the separate arms 20 and 21 it is possible to swing either or both of the polarizing bodies 10 and 11 into position in an optical path of the sextant.

The axis of polarization or the polarizing axis of an optical body which produces plane polarized light is defined as the direction of the electric vector of light transmitted by the body. Thus, in Fig. 1, the arrow 23 designates the polarizing axis of the body 10 and the arrow 24 the polarizing axis of the body 11. When the polarizing axis 24 of the body 11 is parallel to the polarizing axis 23 of the body 10, these two bodies are in a position to transmit a maximum amount of unpolarized light incident thereupon. As the body 11 is rotated in its plane from the parallel position shown, the amount of transmitted light decreases reaching a minimum value of less than 0.5 per cent when the polarizing axis 24 of the body 11 is perpendicular to the polarizing axis 23 of the body 10. For theoretically perfect polarizing bodies $i = i_0 \cos^2 \theta$, where $\theta$ is the angle between the polarizing axes of the two bodies, $i$ is the intensity of the transmitted light for angle $\theta$ and $i_0$ is the intensity of the transmitted light when $\theta = 0$, that is when the polarizing axes 23 and 24 are parallel. According to the foregoing equation, when $\theta = 90°$, that is, when polarizing axes 23 and 24 are perpendicular to each other, $i$ is 0. Actually, polarizing bodies are rarely if ever perfect and do not reduce the light to zero when their axes are perpendicular. Therefore, in practice the factual situation is more accurately stated by the following equation, namely, $i = i_1 + i_0 \cos^2 \theta$, where $i_1$ is the value of $i$ for $\theta = 90°$; and $i_1$ is usually less than 3 per cent of $i_0$.

Two polarizing plates actually constructed by me were of a gray color and a single plate transmitted about 30 per cent of the unpolarized light. These two plates when employed together with their polarizing axes parallel transmitted about 20 per cent of the unpolarized light and with their axes perpendicular transmitted less than 0.5 per cent. With these two plates 10 and 11 mounted as in Fig. 1 the following adjustments were found possible whereby to provide a varying light intensity in a desired optical path.

|  | Light transmission per cent |
|---|---|
| With no plate in optical path | 100 |
| With plate 10 in optical path | 30 |
| With plates 10 and 11 in optical path, axes parallel | 20 |
| Rotating plate 11 | Continuously variable from 20 to |
| Axis of 11 perpendicular to that of 10 | 0.5 |

In the case of the horizon filter 8 (Fig. 2) plate 10 is so mounted in the annular member 12 that when swung into the optical path its polarizing axis 23 will be substantially vertically positioned. The specific orientation of the polarizing axis 23 of the horizon filter 8 serves to provide increased definition of the horizon line when the sextant is in use since the horizontal light vector which causes specular glare is thereby eliminated. The polarizing plate 11 of the horizon filter may be swung into and out of operative position as desired and when in operative position may be rotated to give the desired optical transmission. Thus, it is clear that the horizon filter 8 comprises two polarizing bodies 10 and 11 which serve to fulfill a double function. The polarizing plate 10 when in use is positioned with its axis of polarization 23 in the vertical to thus sharpen the horizon line because of the differential amount of polarization of the light from the sea and sky near the horizon; it also diminishes the glare of the sunpath on the water. The combination of polarizing plate 11 with polarizing plate 10, plate 11 being rotatable, provides a convenient and rapidly adjustable variable filter.

Likewise, the celestial filter 9 comprises two polarizing bodies 10 and 11, one or both of which may be interposed at will into the optical path; and when both are in position one may be rotated with respect to the other to allow the desired reduction in light intensity of the celestial body under observation. Light from celestial bodies, such as the sun, moon, stars, etc., is practically unpolarized. Therefore, it makes no difference in which direction the polarizing axis 23 of the polarizing body 10 of the celestial filter is fixed. It is thus clear that the polarizing bodies 10 and 11 of the celestial filter 9 fulfill only the single function of providing a convenient and rapidly adjustable variable filter.

While I have shown the variable filter of Fig. 1 used in conjunction with a sextant, I do not desire to be restricted thereto since it may be conveniently employed with any other optical instrumentality such as, for example, a telescope or range finder; and when so employed may have its polarizing axis 23 substantially vertically positioned for the purpose described hereinbefore.

According to the provisions of the patent statutes I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described may be used and/or manufactured by or for the Government of the United States of America for governmental purposes without the payment of any royalties thereon or therefor.

I claim:

1. The combination with a sextant of a variable light filter, said filter comprising a plurality of relatively movable polarizing bodies, means for mounting and securing one of said polarizing bodies on and to the sextant and in an optical path of the same, a second means for mounting and adjustably securing another of said polarizing bodies on and to the sextant to enable the selective positioning of this body into and out of an optical path of the sextant but independently of the first mentioned body, and means operable to vary the orientation of the polarizing axis of one of said bodies with respect to the polarizing axis of another body.

2. The combination with an optical instrumentality of a variable light filter comprising a plurality of polarizing bodies, means for mounting and adjustably securing one of said polarizing bodies on and to the optical instrumentality to enable the selective positioning of said body into and out of an optical path of the instrumentality, a second means for mounting and adjustably securing another of said polarizing bodies on and to the optical instrumentality to enable the selective positioning of this body into and out of an optical path of the instrumentality but independently of the first mentioned body, and means operable to vary the orientation of the polarizing axis of one of said bodies with respect to the polarizing axis of another body.

JAMES A. McNALLY.